(12) United States Patent
Thakar et al.

(10) Patent No.: US 6,589,580 B1
(45) Date of Patent: Jul. 8, 2003

(54) METHOD AND APPARATUS FOR APPLICATION OF SURFACE TREATMENT TO FOOD PRODUCTS

(75) Inventors: Hiren H. Thakar, Palatine; John M. Arnold, Springfield, both of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/304,329

(22) Filed: May 3, 1999

(51) Int. Cl.$^7$ .......................... A23C 19/11; A23L 3/3454
(52) U.S. Cl. ...................... 426/310; 426/326; 426/334; 426/335; 426/532; 426/582
(58) Field of Search .................. 426/286, 302, 426/310, 326, 334, 335, 532, 582; 99/452, 516

(56) References Cited

U.S. PATENT DOCUMENTS 2,980,538 A * 4/1961 Wolf ........................... 99/116

(List continued on next page.)

OTHER PUBLICATIONS

*Food Microbiology* 4$^{th}$ Edition Frazier & Westhoff, McGraw Hill Inc New York, 1988.*
H.A. Morris and H.B. Castberg, "Control of Surface Growth on Blue Cheese Using Pimaricin" Cultured Dairy Products Journal, pp. 21–23, May 1980.
Mayasan Food Industries and Trade Inc., web page, Apr. 1, 1999.
NATAMAX Applications Information, Jan. 7, 1999.
Fedco Systems Co., The Slinger, Spin Disk Applicator (1997).
Fedco Systems Co., Food Processing Equipment Catalog (1997).

*Primary Examiner*—Keith Hendricks
*Assistant Examiner*—Drew Becker
(74) *Attorney, Agent, or Firm*—Fitch, Even, Tabin & Flannery (57) ABSTRACT

A method and apparatus for applying a material to food products in a high speed packaging line at a controlled rate in compliance with applicable food-handling equipment standards, preferably in a liquid spray, without immersion, wherein the rate of application is sufficient for efficacy of the material without resulting in transfer of unacceptable quantities of the material or carrier to adjacent line components. The invention is particularly useful for spray application of a liquid antimycotic agent to cheese chunks, at a regulated rate that provides a sufficient surface concentration to inhibit mold growth on the surfaces of the cheese chunks after extended periods of exposure to ambient air, without unacceptable transfer of residue to adjacent components in the packaging line. The invention is preferably employed in application of natamycin to cheese chunks wherein a disk spray system applies a suspension of natamycin in an aqueous saline solution. It has been found that mold growth on cheese chunks can be substantially inhibited by application of natamycin in accordance with the invention at levels as low as about 0.5 $\mu g/cm^2$. In a preferred embodiment of the invention, the process applies an average surface concentration of about 1.0 or 1.1 $\mu g/cm^2$ to ensure that an adequate concentration is applied over substantially the entire exterior surface.

9 Claims, 5 Drawing Sheets

U.S. PATENT DOCUMENTS

| | | | |
|---|---|---|---|
| 3,806,615 A | | 4/1974 | Frankenfeld et al. ........ 426/328 |
| 3,996,386 A | | 12/1976 | Malkki et al. ............... 426/321 |
| 4,148,891 A | | 4/1979 | Smink ........................ 424/181 |
| 4,159,675 A | * | 7/1979 | Schwarz et al. .............. 99/444 |
| 4,309,941 A | * | 1/1982 | Brockwell ................... 99/453 |
| 4,338,342 A | | 7/1982 | Tan et al. .................... 426/308 |
| 4,600,706 A | | 7/1986 | Carter ......................... 514/31 |
| 4,818,546 A | * | 4/1989 | Whitford .................... 426/326 |
| 4,913,043 A | * | 4/1990 | Cheung ..................... 99/450.6 |
| 5,196,344 A | | 3/1993 | Ruttan ......................... 436/18 |
| 5,552,151 A | | 9/1996 | Noordam et al. ............ 424/439 |
| 5,597,598 A | | 1/1997 | van Rijn et al. ............. 426/310 |
| 5,713,788 A | * | 2/1998 | Ferket et al. ................ 452/138 |
| 5,773,062 A | | 6/1998 | Cirigliano et al. ....... 426/330.3 |
| 5,821,233 A | | 10/1998 | van Rijn et al. ............. 514/31 |
| 5,895,680 A | * | 4/1999 | Cirigliano et al. .......... 426/326 |

* cited by examiner

METHOD AND APPARATUS FOR APPLICATION OF SURFACE TREATMENT TO FOOD PRODUCTS

BACKGROUND OF THE INVENTION

The invention relates to commercial production and packaging of food products, and more particularly to application of materials such as antimycotic agents as surface treatments. The invention is particularly well-suited for application of natamycin, but may also be useful for application of other antimicrobial agents, or for application of other materials such as nutritional supplements, vitamins, other food additives, and colorants.

Application of natamycin to cheese shreds and small cubes has been accomplished by spraying a suspension of natamycin in an aqueous saline solution onto the shreds and cubes in a drum tumbler. For larger blocks of cheese, such as cheese chunks having a weight on the order of 8–12 oz., literature has recommended applying natamycin by dipping in a suspension of 1250 ppm natamycin, to provide a surface concentration of about 2.56–5.12 $\mu g/cm^2$ on most block cheeses. Higher surface concentrations of 5.12 $\mu g/cm^2$ or more have been recommended for blue cheese.

One commercial cheese chunk packaging system that has not included application of antimycotic agents is described below. The system includes stations for cutting, weighing, confirming absence of metal, and indexing the cheese chunks, then forming, filling and sealing the packages. The cutting step involves use of cutting equipment to divide a large (e.g., 680 lb.) block of cheese into a plurality of much smaller chunks of generally rectangular configuration. The chunks typically have a weight of about 10 oz. The chunks are then weighed, indexed, and conveyed to form/fill/seal apparatus that provides an individual hermetically sealed, gas-flushed package for each chunk. The operation is carried out at high speeds. The cheese chunks may travel, e.g., at about 145 ft./minute as they enter the form/fill/seal station.

One of the problems that must be addressed in application of liquids to food products in high speed packaging lines such as the one described above is avoidance of wetting of line components near the liquid application station. Application of liquid to food products can result in transfer of residue from the food products to downstream conveyors and other equipment. Also, liquid spray may be incidentally dispersed to upstream and downstream line components. This may interfere with proper operation of the equipment, and may present sanitation concerns. Saline solutions particularly can corrode conveyor bearings and other components of food-handling equipment. Another concern is that avoidance of microbial growth on the food product itself may be made more difficult where the food product has a wet exterior surface.

It is a general object of the invention to provide a commercial method and apparatus for surface treatment of food products that addresses the above problems.

SUMMARY OF THE INVENTION

The invention provides a method and apparatus for in-line application of a surface treatment to food products at a controlled rate in compliance with applicable food-handling equipment sanitation standards, wherein the rate of application is sufficient for efficacy of the surface treatment without resulting in transfer of unacceptable quantities of residue to adjacent line components, and wherein the material is applied without tumbling of the food products. The invention is particularly useful for spray application of a liquid antimycotic agent such as natamycin to cheese chunks, at a regulated predetermined rate to provide a sufficient surface concentration to inhibit mold growth on the surfaces of the cheese chunks throughout extended periods of exposure to ambient air, without unacceptable transfer of residue to adjacent components. The invention may also be useful for application of other antimicrobial agents, or for other materials such as nutritional supplements, vitamins, and colorants.

In one particular embodiment, the material applied comprises a suspension of natamycin in an aqueous saline solution. It has been found that mold growth on cheese chunks can be substantially inhibited by application of natamycin in accordance with the invention at surface concentration levels substantially lower than the recommended 2.56 $\mu g/cm^2$, and specifically levels as low as about 0.5 $\mu g/cm^2$ have been found to be effective in preventing mold growth on refrigerated cheese chunks exposed to ambient air for extended periods. In a preferred embodiment of the invention, the process applies an average surface concentration of about 1.0 to 1.1 $\mu g/cm^2$ to ensure that an adequate concentration is applied over substantially the entire exterior surface. Application of natamycian at these average surface concentrations with the apparatus of the invention ensures that substantially all of the cheese chunk surface area has a surface concentration of at least about 0.5 $\mu g/cm^2$.

The efficacy of an antimycotic agent may be measured in terms of the number of days during which mold growth is retarded in treated samples, relative to untreated control samples. Generally, if mold growth is retarded by 45 days or more, the antimycotic may be considered effective. The absolute length of time during which mold growth is delayed depends on the mold load in the ambient air, in addition to effects of antimycotic agents.

Application of antimycotic agent in accordance with the preferred embodiment of the invention has been effective in retarding mold growth by over 45 days, and has resulted in cheese chunks remaining mold-free for over 200 days in some cases, when refrigerated at typical refrigeration temperature of, e.g., 35° F. to 45° F., and exposed to ambient air.

The preferred embodiments involve application to cheddar cheese or other food products having similar antimycotic requirements. The invention may also be useful with food products having different antimycotic requirement, with appropriate adjustment of the process parameters. The apparatus is preferably compact so as to avoid adding unnecessarily to the floor space requirements of the packaging line. To this end, the apparatus preferably employs only three spray disks to provide substantially complete coverage of the cheese chunks.

The apparatus is preferably employed in line with equipment for cutting the cheese chunks from a larger block, then weighing the individual chunks, confirming absence of metal in the chunks, indexing the chunks, and forming, filling and sealing a hermetic, gas flushed individual package for each chunk.

The invention preferably employs a disk spray system, and preferably includes a conveyor having a gap between adjacent segments to permit application of spray from beneath the chunks as they traverse the gap.

To avoid penetration of the spray into the bearings of the conveyor shafts while also avoiding frictional impedance of shaft rotation, non-contacting interior shaft seals are preferably provided on the inside of the side walls at each end of one or more of the conveyor shafts. One or more of the conveyor shafts may also be provided with one or more grooves cooperating with surrounding shaft seals to inhibit flow of liquid toward the bearings.

To facilitate removal from the line for cleaning and/or maintenance, the apparatus preferably is movable, and to this end may be equipped with wheels, rollers, low friction sliders, or the like, and may be mounted on a track.

A spray enclosure is preferably provided to limit transfer of liquid spray to surrounding areas. The enclosure preferably surrounds the conveyor except for openings at the entrance and exit ends of the apparatus. To limit escape of fluid through these openings, the apparatus preferably includes means to remove liquid from the conveyor near its ends.

The apparatus preferably complies with USDA and Dairy 3A standards. To this end, interior components of the apparatus preferably are readily removable for cleaning. The conveyor preferably comprises an O-ring conveyor, with each segment comprising a plurality of O-rings under tension extending in parallel between a pair of rotary shafts that are disposed at its opposite ends. To reduce O-ring tension and bearing loads, the shafts at opposite ends of each conveyor segment may be driven in timed relation.

The apparatus preferably includes means for collecting excess spray, and the enclosure preferably includes a hood or housing. The hood includes means to direct fluid collected on interior surfaces thereof into the receptacle while preventing such fluid from dripping onto the food products, comprising one or more channels affixed to an interior surface of the hood. Each channel preferably has a minimum width sufficient to permit access by cleaning equipment and compliance with USDA and Dairy 3A standards.

Fluid collected for recirculation is preferably mixed with newly introduced fluid in a reservoir. A separation device such as a basket filter may be employed in the reservoir to facilitate separation of large particles of food product from the liquid collected, so that the liquid can be recirculated without entrainment of such food particles. Additional filtration may be provided at other locations in the recirculation system

DETAILED DESCRIPTION OF THE PREFERRED EMBODIMENTS

The invention is preferably embodied in a method and apparatus 10 for in-line application of a surface treatment to food products 12. In the illustrated embodiment, the apparatus is particularly adapted for application of an antimycotic agent comprising a suspension of natamycin in an aqueous saline solution. In other embodiments, the method and apparatus may be adapted for application of other antimycotic agents, or for application of other materials, e.g., nutritional supplements such as calcium, vitamins, other food additives such as lactose, or colorants. These materials might be applied individually or in combination with one another.

Figure 1:
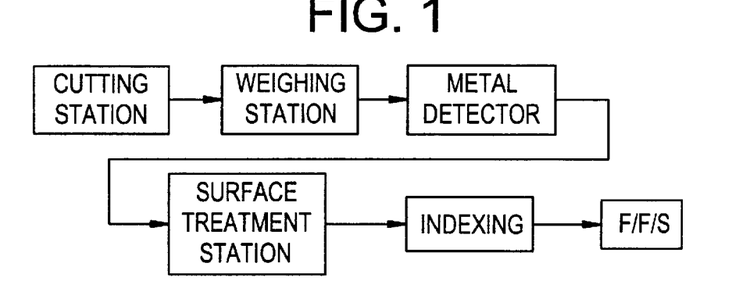
FIG. 1 is a schematic view of a packaging line in accordance with a preferred embodiment of the invention.

FIG. 1 provides a schematic illustration of a food packaging line wherein the invention is embodied in an antimycotic application station. The packaging line includes a cutting station for dividing a large block of cheese weighing, e.g., 600–700 lbs. into a plurality of chunks for individual packaging. The chunks typically have a generally rectangular block configuration, with a weight in the range of about 4 oz. to 16 oz. One particular commercial chunk size has a length of between about 4 in. and 6 in., a height and width of between 1 and 2 inches, and a weight of about 10 oz.

The chunks are carried downstream of the cutting station on one or more conveyors through a weighing station for determining the weight of the individual chunks, followed by a metal detector. The chunks are then transferred to a conveyor in the surface treatment station, wherein a liquid spray is applied as a surface treatment. The chunks are then conveyed through an indexing station wherein they are aligned, and finally to a form/fill/seal station, wherein an individual hermetic, gas-flushed package is formed about each chunk.

Figure 2:
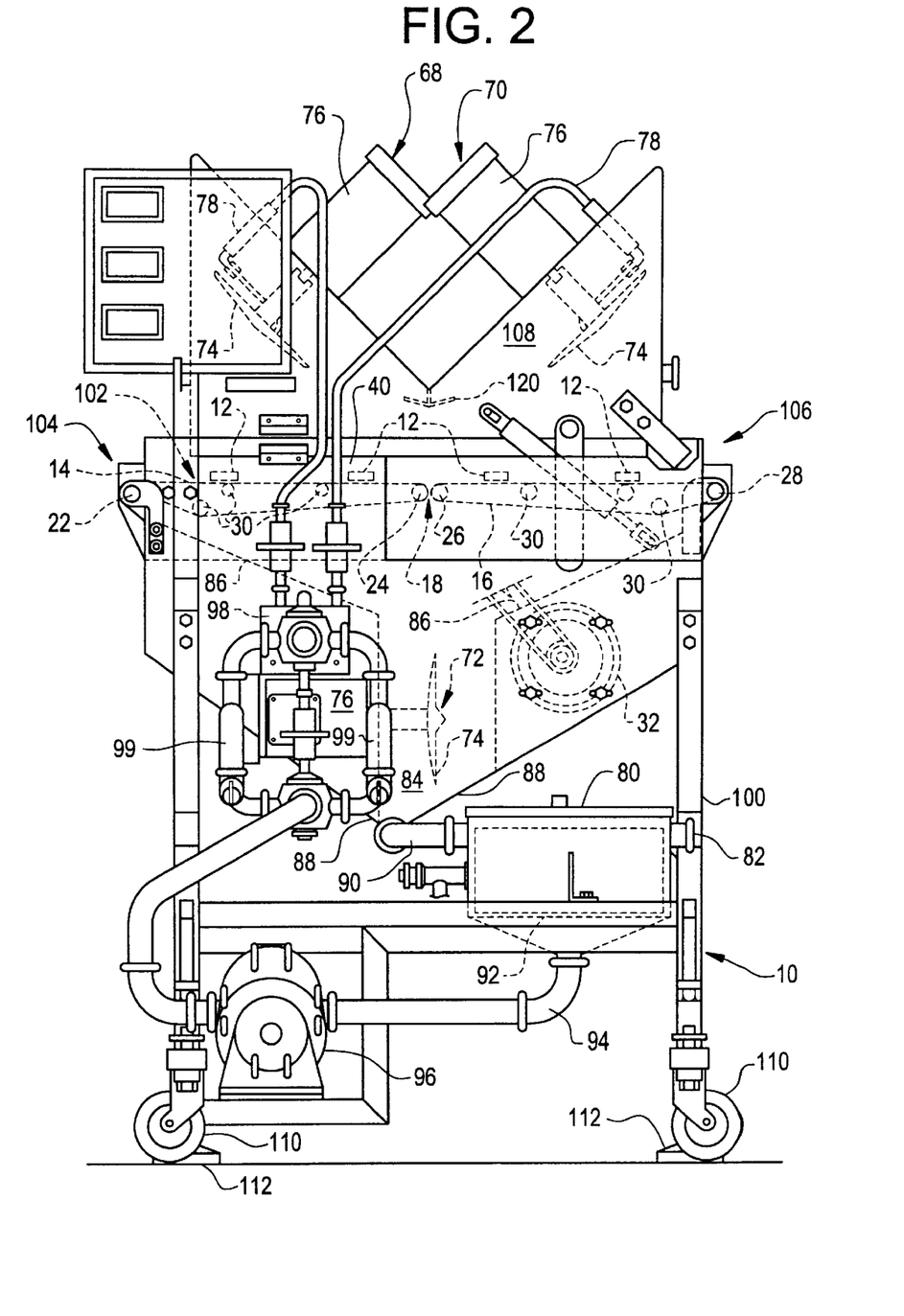
FIG. 2 is a front elevational view of the apparatus in accordance with a preferred embodiment of the invention.
Figure 3:
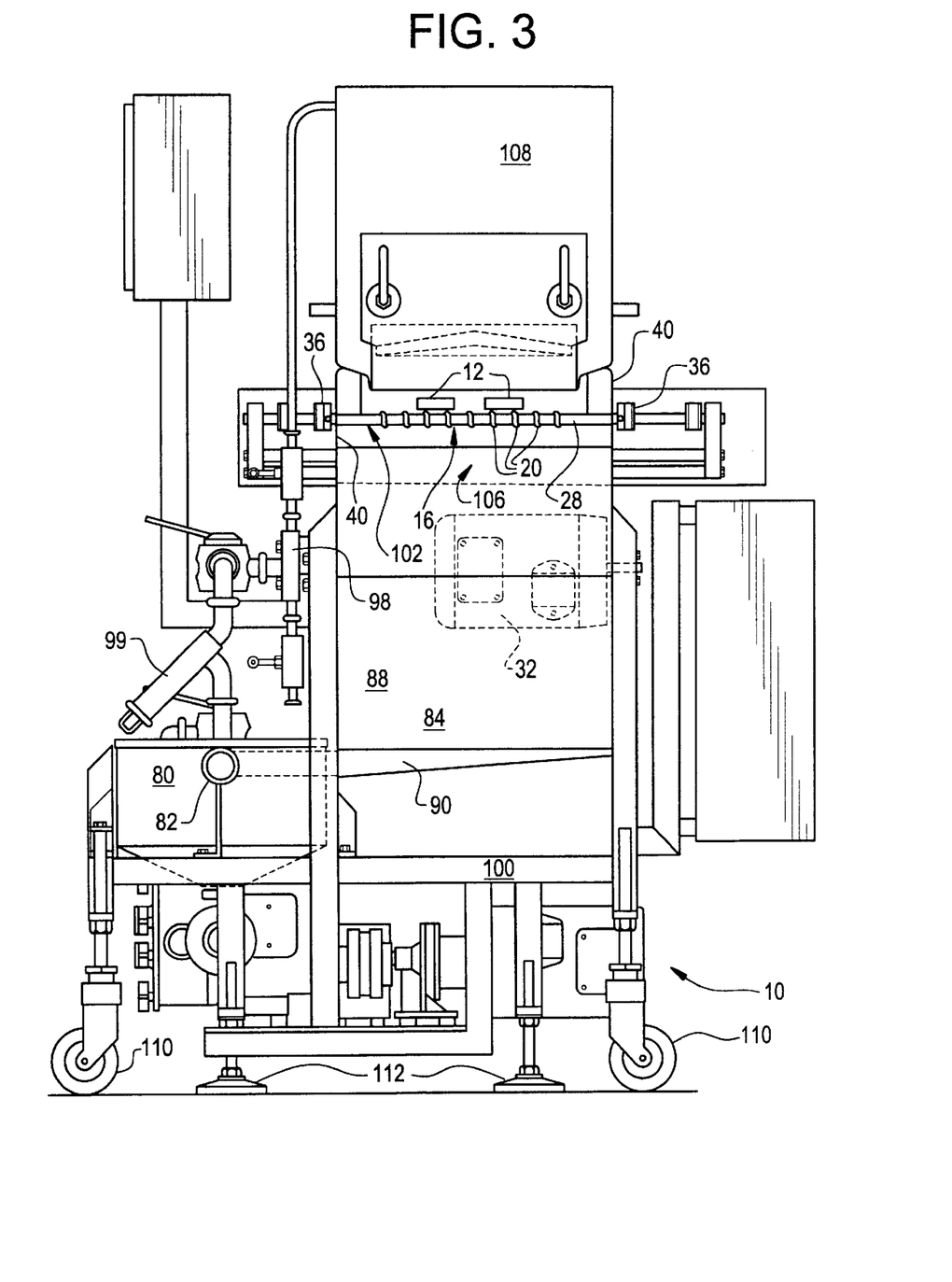
FIG. 3 is an end elevational view of the apparatus of FIG. 2.
Figure 4:
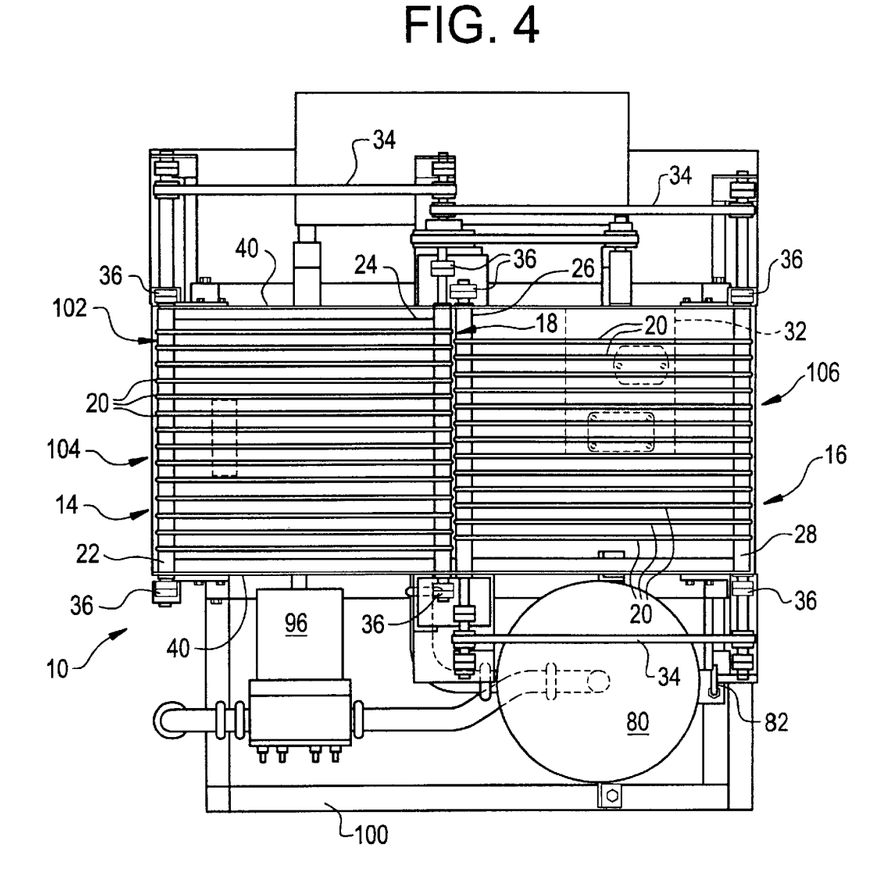
FIG. 4 is a plan view of the apparatus of FIG. 2, shown with the hood removed.

The apparatus for application of the surface treatment generally includes a frame 100, a conveyor 102 supported on the frame for transporting food products from an entrance 104 to an exit 106, means for applying the surface treatment to food products as they are transported on the conveyor, and an enclosure or housing 108 to provide containment for the surface treatment operation. The apparatus is preferably movable so that it may be removed from the line for cleaning and maintenance while similar apparatus is substituted. To this end, the apparatus may be provided with wheels, sliders or the like, or may be movably mounted on a track disposed generally perpendicular to the packaging line. In the illustrated embodiment, wheels 110 are provided on the bottom of the frame, along with vertically adjustable feet 112 to stably support the apparatus during use.

In the preferred embodiment, all interior components of the apparatus are readily capable of being cleaned and are in compliance with USDA standards and Dairy 3A standards.

Conveyor

While the invention may be employed with packaging lines operating at any desired speed, it is contemplated that speeds from about 30 feet per minute to about 250 feet per minute are likely to be employed. In one particular embodiment, for purposes of example, the line typically operates at about 145 feet per minute. It is desirable that the apparatus of the invention be capable of functioning at line speeds of at least 200 feet per minute, and preferably up to 250 feet per minute.

In contrast to the above-mentioned methods that have been used in the past for commercial application of natamycin to cheese shreds and small cubes, wherein the shreds and cubes are passed through a drum tumbler wherein a natamycin spray is applied, the preferred apparatus conveys the food products without tumbling, which helps to preserve the weight, shape, and dimensions of the cheese chunks throughout the application process and helps to avoid excessive separation of particles from the chunks during the surface treatment operation.

The illustrated conveyor comprises first and second conveyor segments 14 and 16 disposed in series, with a gap between them to permit application of surface treatment from beneath the food products as they span the gap. The first segment 14 receives product at the entrance end of the apparatus, and the second segment 16 discharges product at the exit end. The conveyor in the preferred apparatus is disposed closely adjacent conveyors at its opposite ends.

Each conveyor segment in the preferred embodiment of the invention comprises a plurality of flexible, resilient longitudinal members 20 removably supported on a plurality of transverse conveyor shafts. The longitudinal members preferably comprise elastomeric O-rings. The first conveyor segment 14 is preferably driven at both ends by a first pair of conveyor drive shafts 22 and 24, and the second conveyor segment 16 is driven by a second pair of drive shafts 26 and 28. The drive shafts preferably have circumferential grooves to receive the O-rings.

The conveyor segments are preferably driven in timed relation by a single motor 32. The motor and conveyor drive shafts may be connected to one another for rotation in timed relation by any desired means, including belts, chains, gears, or combinations of these or other elements. In the illustrated embodiment, the motor and conveyor drive shafts are interconnected by timing belts 34 located outside of the enclosure.

To limit sagging of the O-rings 20 within acceptable limits without requiring unduly high tension on the O-rings, one or more intermediate support rollers 30 may be provided between drive shafts on each conveyor segment.

Figure 5:
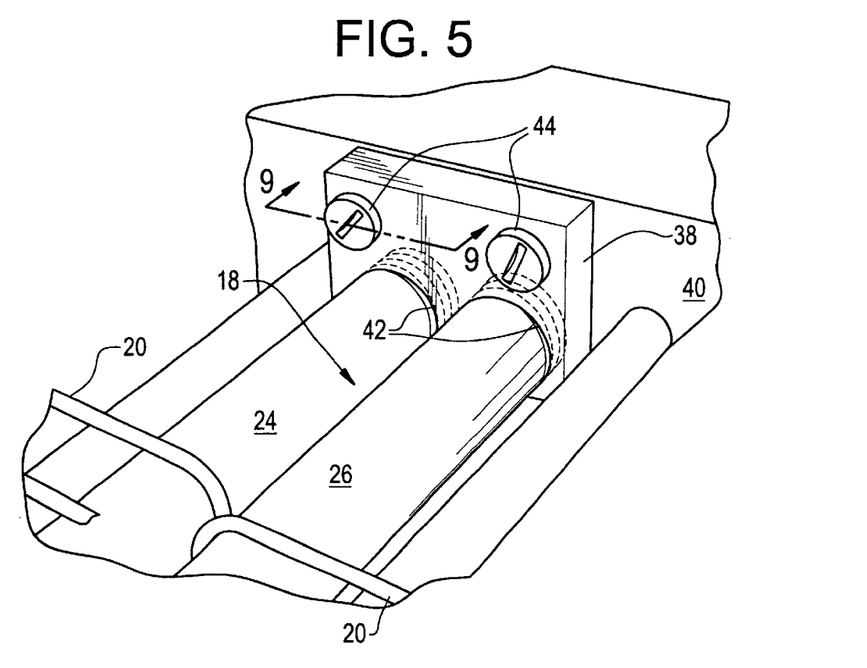
FIG. 5 is a perspective view of a shaft seal employed in the apparatus of FIG. 2.
Figure 9:
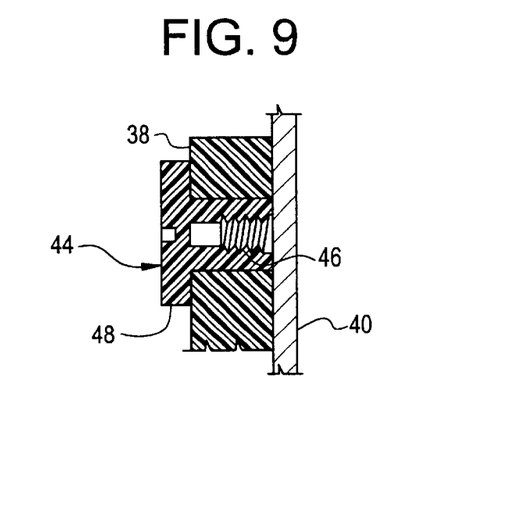
FIG. 9 is a sectional view taken substantially along line 9—9 in FIG. 5.

To avoid penetration of liquid into the bearings 36 of the conveyor drive shafts, shaft seals 38 are preferably provided on the interior of the apparatus 10, at each end of each of the drive shafts. The bearings are preferably mounted externally of the enclosure, and spaced from the side walls 40. The ends of each conveyor drive shaft pass through openings in the side walls of the housing 108. At each opening, a shaft seal 38 extends inward of the side wall about the shaft. Each shaft seal preferably has a generally cylindrical bore surrounding the shaft in nonconducting relation therewith to restrict flow of fluid outward along the shaft toward the bearing without imposing substantial frictional loads on the shaft. One or more projections or grooves 42 may be provided in the shaft adjacent the shaft seal to further inhibit outward flow. In the illustrated embodiment, a helical groove is provided in each shaft, extending from the sidewall to a point slightly inward of the shaft seal, with appropriate right hand and left hand configurations provided to pump inward fluid that enters the cylindrical gap between the shaft and the shaft seal.

To facilitate cleaning of the shaft seals, each of the shaft seals is removably held in place during operation by one or more fasteners 44. The fasteners and shaft seals are configured to facilitate cleaning of the shaft seals and interior of the apparatus when the shaft seals are removed. In the illustrated embodiment, the fasteners extend through large, easily cleanable bores in the shaft seals, and engage inwardly extending studs 46 on the side wall of the housing. The employment of inwardly-extending studs to support the shaft seals avoids use of holes in the sidewalls that could accumulate fluid or food matter. Each of the illustrated fasteners comprises an enlarged head 48 engaging the inner wall of the shaft seal, and a shaft having an internally threaded socket at its end for receiving one of the studs. Each of the fasteners preferably is made of an inexpensive plastic material so as to be disposable.

Figure 6:
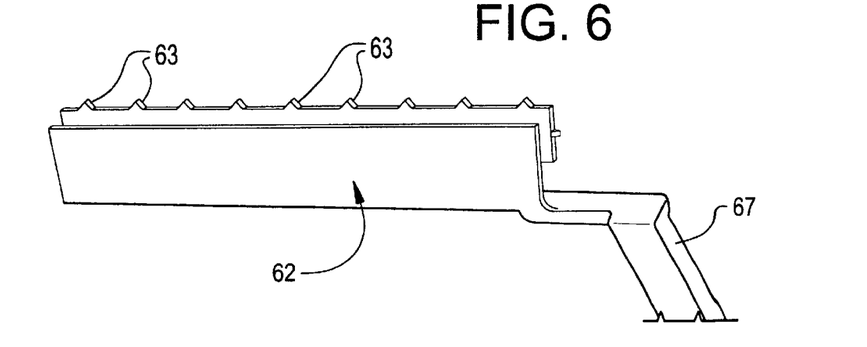
FIG. 6 is a perspective view of a first wiper employed in the apparatus of FIG. 2.
Figure 7:
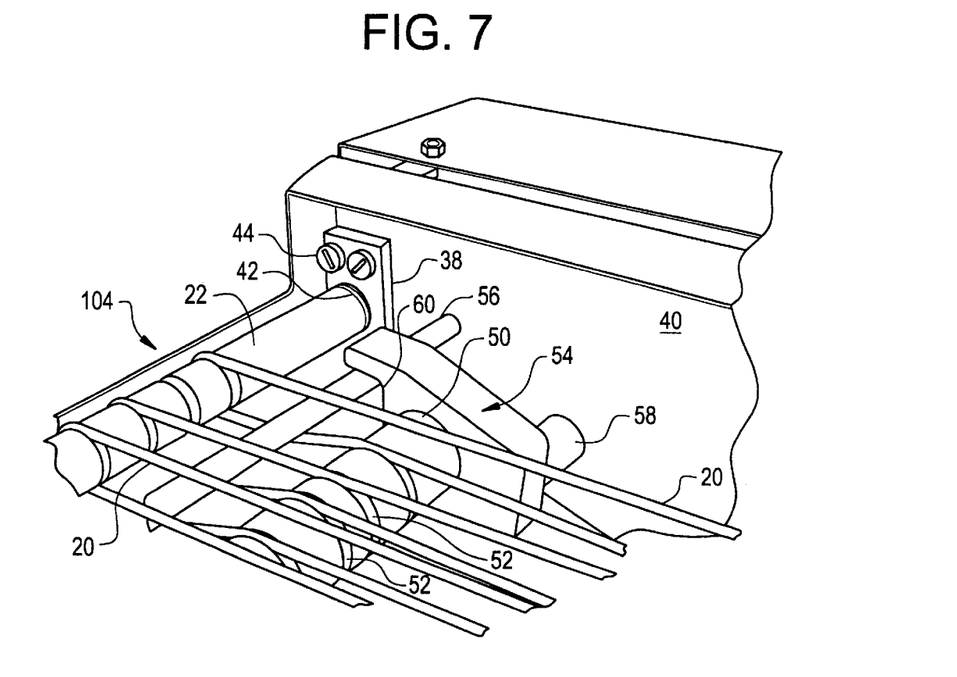
FIG. 7 is a perspective view of the first wiper, installed in the apparatus of FIG. 2.

To limit dispersion of liquid to the exterior of the housing at the conveyor ends, wipers are preferably provided adjacent each end of the conveyor. At the entrance end, liquid received on the drive shaft from the O-rings on the bottom of drive shaft 22 may result in centrifugal spray of liquid from the outer portion of the conveyor drive shaft in an upward and outward dispersion. To address this problem, a wiper roller 50 preferably is provided to engage the O-rings as they approach the bottom of the conveyor drive shaft.

The illustrated wiper roller 50 has circumferential grooves 52 formed therein to receive the O-rings and to wipe fluid therefrom. The wiper roller preferably comprises a unitary, one-piece, generally cylindrical roller having a longitudinal bore for receiving a removable stainless steel shaft. A pair of hangers 54 are provided for supporting opposite ends of the stainless steal shaft. Each hanger preferably has means for engaging fixed structural supports 56 and 58 extending inward from the housing side walls so that the hanger 54 is constrained against downward movement by the structural supports. In the preferred embodiment, the O-rings engage the top of the wiper roller, with the O-rings constraining the wiper roller assembly against upward displacement.

In the illustrated embodiment, each hanger has an opening in its inner wall for receiving an end of the roller shaft, a first recess 60 opening downward and outward for receiving the first structural component; and a second, generally U-shaped slot (not shown) opening downwardly on its outer wall for receiving the second structural component.

Figure 8:
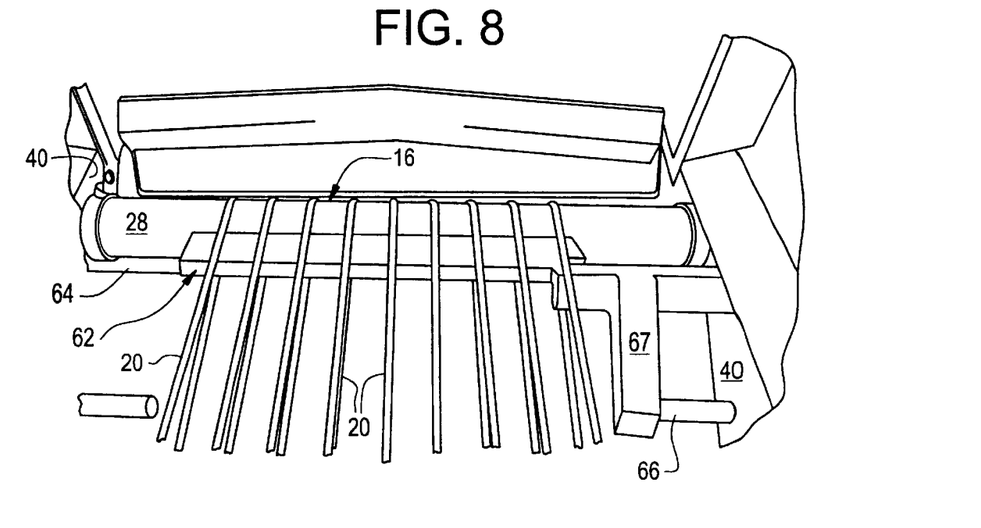
FIG. 8 is a perspective view of a second wiper, installed in the apparatus of FIG. 2.

At the exit end of the apparatus, where centrifugal spray of liquid from the outer portion of the conveyor drive shaft 28 is generally directed downward and outward, fluid dispersion outside of the apparatus generally results from fluid carried upward on the interior side of the shaft, i.e., the side facing the interior of the apparatus, then outward over the top of the roller. To address this problem, a low-profile stationary wiper 62 is preferably positioned adjacent the interior side of the conveyor shaft, in nonconducting relation thereto, to remove excess fluid therefrom. The stationary wiper is preferably positioned within the O-rings in close proximity to shaft 28, e.g., with about 5 mils of clearance, so as to remove substantially all fluid from the shaft without frictional engagement therewith. It should be appreciated that, in operation, contact may occur between the stationary wiper and the drive shaft, but that excessive friction should not result, insofar as any contact pressure should be very low.

The stationary wiper preferably has a series of projections 63 in complementary engagement with the circumferential grooves on the drive shaft to remove fluid from the grooves. The wiper 62 is supported by transverse rods 64 and 66 supported by the sidewalls, and may have one or more suitable grooves or recesses for receiving the rods 64 and 66. The wiper 62 is held in place by gravity, and includes a weight 68 to increase its stability. It can be removed for cleaning simply by lifting it from its supports 64 and 66.

Spray Applicators

The surface treatment preferably employs a liquid that is applied as a spray by spin disk assemblies. In the illustrated embodiment, substantially complete coverage of each cheese chunk is obtained with the use of three spin disk assemblies 68, 70 and 72, one disposed beneath the conveyors, and two disposed thereabove.

Each spin disk assembly comprises a rotary disk 74 driven by a motor 76 and rotated at sufficient speed to generate a spray of finely divided droplets of liquid. Liquid is dispensed onto the disks by supply conduits 78 located adjacent each of the disks. The rate of application of the surface treatment material may be varied by variation of the flow rate of liquid through the supply conduits.

The lower disk unit 72 is disposed so that its spray aligns generally with the gap 18 between the conveyor segments to apply fluid to bottom surfaces of the food products 12 as they traverse the gap. The other disk units 68 and 70 are disposed above the conveyors, with each being disposed at approximately a 45° angle to the conveyor, and with the respective units being laterally offset relative to one another so that substantially complete coverage of each food product is achieved by the three units.

Fluid Supply and Recirculation

As noted above, the invention may be useful for application of antimicrobial agents, or for application of other materials such as nutritional supplements, vitamins, other food additives, and colorants. In one particular embodiment, the material applied comprises a suspension of natamycin in an aqueous saline solution. The concentration of natamycin in this solution is about 1250 ppm.

In a preferred embodiment of the invention, the process applies an average surface concentration of about 1.0 or 1.1 $\mu g/cm^2$ to ensure that an adequate concentration is applied over substantially the entire exterior surface. The preferred embodiments involve application to cheddar cheese or other food products having similar antimycotic requirements. The invention may also be useful with food products having different antimycotic requirements, with appropriate adjustment of the process parameters.

Fluid for dispensing to the disk spray units is preferably distributed from a reservoir 80 that receives new fluid from a supply tank through an inlet conduit 82 and receives additional fluid from a recirculation system that captures excess fluid beneath the conveyor. The excess fluid is collected by a receptacle 84 that preferably includes upper and lower bottom walls 86 and 88 sloping downward toward each other along the bottom of the receptacle to direct fluid into a drain conduit 90, and therethrough into the reservoir. To maintain a low average dwell time for fluid in the reservoir, the volume of the reservoir and the volume of fluid in the reservoir preferably are small. For example, the reservoir may have a capacity of about two gallons, with only about one gallon of fluid being maintained therein during operation.

A separator such as a large basket filter 92 is preferably provided in the reservoir to facilitate separation of large particles of food product from the fluid. A drain 94 at the bottom of the reservoir is connected to a pump 96 which recirculates the fluid to a distribution header 98. The distribution header preferably includes a pair of filters 120 disposed in parallel, and appropriate valving so that either filter may be taken off line for cleaning or replacement while the apparatus continues to operate. The header then distributes the fluid to the three disk spray units through the supply conduits 78.

One or more gutters 120 collect excess fluid on the interior of the enclosure. Each gutter has a sufficient width to permit access to cleaning brushes.

The preferred apparatus employs spin disk applicator equipment available from Fedco Systems Co. of Odessa, Fla.

CONCLUSION

From the foregoing, it should be appreciated that the invention provides a novel and improved method and apparatus for surface treatment of food products. The invention is not limited to the embodiments described above or to any particular embodiments. The invention is further described and pointed out in the following claims.

What is claimed is:

1. A method of applying an antimycotic liquid spray to cheese chunks having a weight of 4 oz. to 16 oz. in a packaging line comprising:

transporting cheese chunks on a conveyor from a first location to a second location in said packaging line at a speed of at least about 30 ft./minute without tumbling;

providing a supply of antimycotic liquid material comprising natamycin;

spraying said antimycotic liquid material onto external surfaces of said cheese chunks within enclosed spraying apparatus to inhibit mold growth on said cheese chunks, while said cheese chunks are transported without tumbling from said first location to said second location; and thereafter transferring said cheese chunks from said enclosed spraying apparatus to said downstream apparatus;

wherein said conveyor comprises a plurality of O-rings and a plurality of conveyor shafts, each of said conveyor shafts having a plurality of grooves therein for receiving said O-rings, said method further comprising removing liquid from at least one of said conveyor shafts by a wiper in close proximity thereto having ribs complementary to the grooves on said at least one of said conveyor shafts.

2. A method in accordance with claim 1 comprising application of natamycin having a surface concentration between about 0.5 $\mu g/cm^2$ and about 1.1 $\mu g/cm^2$.

3. A method in accordance with claim 1 wherein application of said antimycotic liquid material comprises application of a suspension of natamycin in an aqueous saline solution, using spray apparatus comprising exactly three disk sprayers disposed within a spray enclosure and positioned so that complete coverage of each cheese chunk may be obtained with only said three disk sprayers.

4. A method in accordance with claim 3 further comprising moving said spray apparatus into and out of said packaging line for substitution of like apparatus to permit cleaning and maintenance of said apparatus at regular periodic intervals with minimal line downtime.

5. A method in accordance with claim 4 wherein said conveyor includes at least one rotary conveyor shaft, a pair of bearings supporting said shaft, and at least one removable shaft seal adjacent at least one of said bearings.

6. A method in accordance with claim 5 further comprising providing a receptacle for collecting excess antimycotic agent, and limiting environmental dispersion of spray with an enclosure about at least a portion of said conveyor, said enclosure including an upper portion and a lower portion, said method further comprising collecting excess antimycotic agent from interior surfaces of said upper portion and directing said excess antimycotic agent to said receptacle, thereby preventing said excess liquid from dripping onto said cheese chunks, through at least one channel having a sufficient width to permit access by cleaning brushes.

7. A method in accordance with claim 6 further comprising removing liquid from said O-rings to limit transfer of liquid to one or more conveyor shafts.

8. A method in accordance with claim 7 wherein removing liquid from said O-rings comprises engaging said O-rings with a second wiper having grooves for receiving said O-rings.

9. A method in accordance with claim 8 further comprising constraining at least one of said wipers by O-ring tension.

* * * * *

UNITED STATES PATENT AND TRADEMARK OFFICE
CERTIFICATE OF CORRECTION

PATENT NO. : 6,589,580 B1  
DATED : July 8, 2003  
INVENTOR(S) : Thakar et al.

It is certified that error appears in the above-identified patent and that said Letters Patent is hereby corrected as shown below:

<u>Title page,</u>  
Item [75], Inventors: "Hiren H. Thakar, Palatine," delete ";"and add -- , IL (US) --; and after "John M. Arnold, Springfield" delete both of IL (US)" and add -- MO (US) --.

Signed and Sealed this

Eighteenth Day of May, 2004

JON W. DUDAS  
*Acting Director of the United States Patent and Trademark Office*